United States Patent
Hsu

(10) Patent No.: US 7,722,214 B2
(45) Date of Patent: May 25, 2010

(54) SUBSTRATE STRUCTURE AND SIDE-ENTRANCE LIGHTING STRUCTURE

(75) Inventor: Ching-Feng Hsu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 329 days.

(21) Appl. No.: 11/943,730

(22) Filed: Nov. 21, 2007

(65) Prior Publication Data

US 2009/0097276 A1    Apr. 16, 2009

(30) Foreign Application Priority Data

Oct. 12, 2007    (TW)    ............... 96138273 A

(51) Int. Cl.
*F21V 7/00* (2006.01)
(52) U.S. Cl. ............ 362/247; 362/217.05; 362/249.02; 362/301; 362/346; 362/609; 362/612
(58) Field of Classification Search ............ 362/217.05, 362/241, 247, 249.02, 301, 346, 545, 609, 362/612, 613, 634, 800, 623
See application file for complete search history.

(56) References Cited

U.S. PATENT DOCUMENTS

2006/0187376 A1    8/2006    Wang et al.

2007/0247870 A1*  10/2007    Sakai et al. ................. 362/634

FOREIGN PATENT DOCUMENTS

| JP | 2007/212931 | 8/2007 |
|---|---|---|
| WO | WO 2007/058501 | 5/2007 |

OTHER PUBLICATIONS

English language translation of abstract and pertinent parts of WO 2007/058501.
English language translation of abstract and pertinent parts of JP 2007/212931.

* cited by examiner

*Primary Examiner*—Stephen F Husar
(74) *Attorney, Agent, or Firm*—Thomas, Kayden, Horstemeyer & Risley

(57) ABSTRACT

A substrate structure includes a substrate, a plurality of point light sources, a first wall and a plurality of convex members. The point light sources are disposed on the substrate. The first wall is on a long side of the substrate and substantially perpendicular to the substrate. The convex members extend from the first wall along a direction that is substantially perpendicular to the substrate. The convex members keep away the point light sources from optical sheets when installing the substrate structure into a frame. Moreover, a side-entrance lighting structure is disclosed.

19 Claims, 4 Drawing Sheets

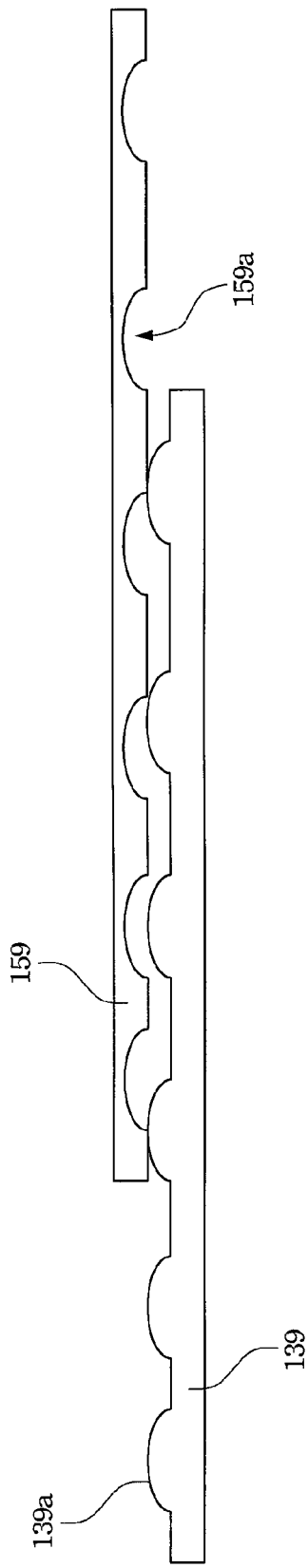
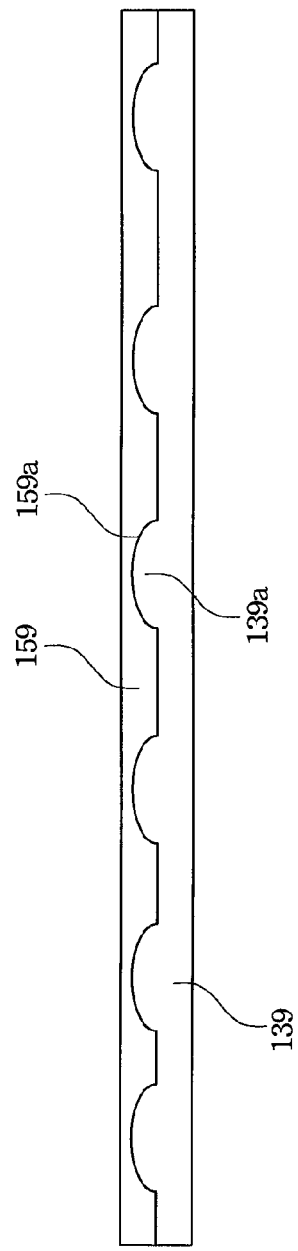
Fig. 4A
Fig. 4B

SUBSTRATE STRUCTURE AND SIDE-ENTRANCE LIGHTING STRUCTURE

RELATED APPLICATIONS

This application claims priority to Taiwan Patent Application Serial Number 96138273, filed Oct. 12, 2007, which is herein incorporated by reference.

BACKGROUND

1. Field of Invention

The present invention relates to a backlight module. More particularly, the present invention relates to a side-entrance lighting structure of a backlight module.

2. Description of Related Art

Liquid crystal display (LCD) panels are light and thin, and have many advantages that include low power consumption. LCD panels are applied in many electronic products. Since liquid crystals themselves do not emit light, an external light source is necessary for an LCD panel. Therefore, a backlight module is one of key components for an LCD panel.

Generally speaking, the backlight module light source can mainly comprise a cold cathode fluorescent lamp (CCFL) or a light emitting diode (LED). LED light sources have advantages including high brightness, excellent color purity, a long life cycle, no mercury concentration, and good reliability. The backlight module structure could be a bottom lighting structure or an edge lighting structure.

Bottom lighting structures are normally used in large size backlight modules. After light is emitted and reflected through a reflector, the light is dispersed uniformly through a diffuser. Advantages of a bottom lighting structure include high luminance, good viewing angle, and simple structure. However, bottom lighting structures are thick and heavy, and increase the power consumption of the backlight module.

Edge lighting structures are generally used in small or medium size backlight modules. Light from an edge lighting structure is emitted to a side section of a backlight module. The advantages of an edge lighting structure include a light weight, a small volume, and a low power consumption. However, electrical elements or optical sheets are easily damaged when the light source is too close to the optical sheets during the installation or replacement of the light source. However, optical efficiency decreases when there is an excessively large space between optical films and light source.

SUMMARY

Hence, to solve the foregoing problem, the invention provides a substrate structure and a side-entrance lighting structure, wherein convex members of a wall in the substrate structure prevent direct contact between point light sources and an optical sheet when the substrate structure is installed into a frame. The structure can prevent damage to electrical elements and optical sheets, without decreasing the optical efficiency.

To achieve the above purpose, the invention provides a substrate structure comprising a substrate, a plurality of point light sources, a first wall, and a plurality of convex members. The point light sources are disposed on the substrate; the first wall is on a long side of the substrate and substantially perpendicular to the substrate; the convex members extend from the first wall along a direction that is substantially perpendicular to the substrate.

The invention also provides a side-entrance lighting structure comprising a substrate structure and a frame. The substrate structure comprises a substrate, a plurality of point light sources, a first wall, and a plurality of convex members. The point light sources are disposed on the substrate; the first wall is on a long side of the substrate and substantially perpendicular to the substrate; the convex members extend from the first wall along a direction that is substantially perpendicular to the substrate. Moreover, the frame has an opening located on the bottom corner of the frame, wherein the substrate structure is installed into the frame through the opening.

The substrate structure and side-entrance lighting structure of the present invention can prevent damage to electrical elements and an optical sheet, and increase the optical efficiency.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 4A is a schematic cross-section of convex members of a first wall and concave sections of a third wall according to the present invention; and FIG. 4B is a schematic cross-section of an engagement of the convex members and the concave sections according to the present invention.

DESCRIPTION OF THE PREFERRED EMBODIMENTS

Figure 1:
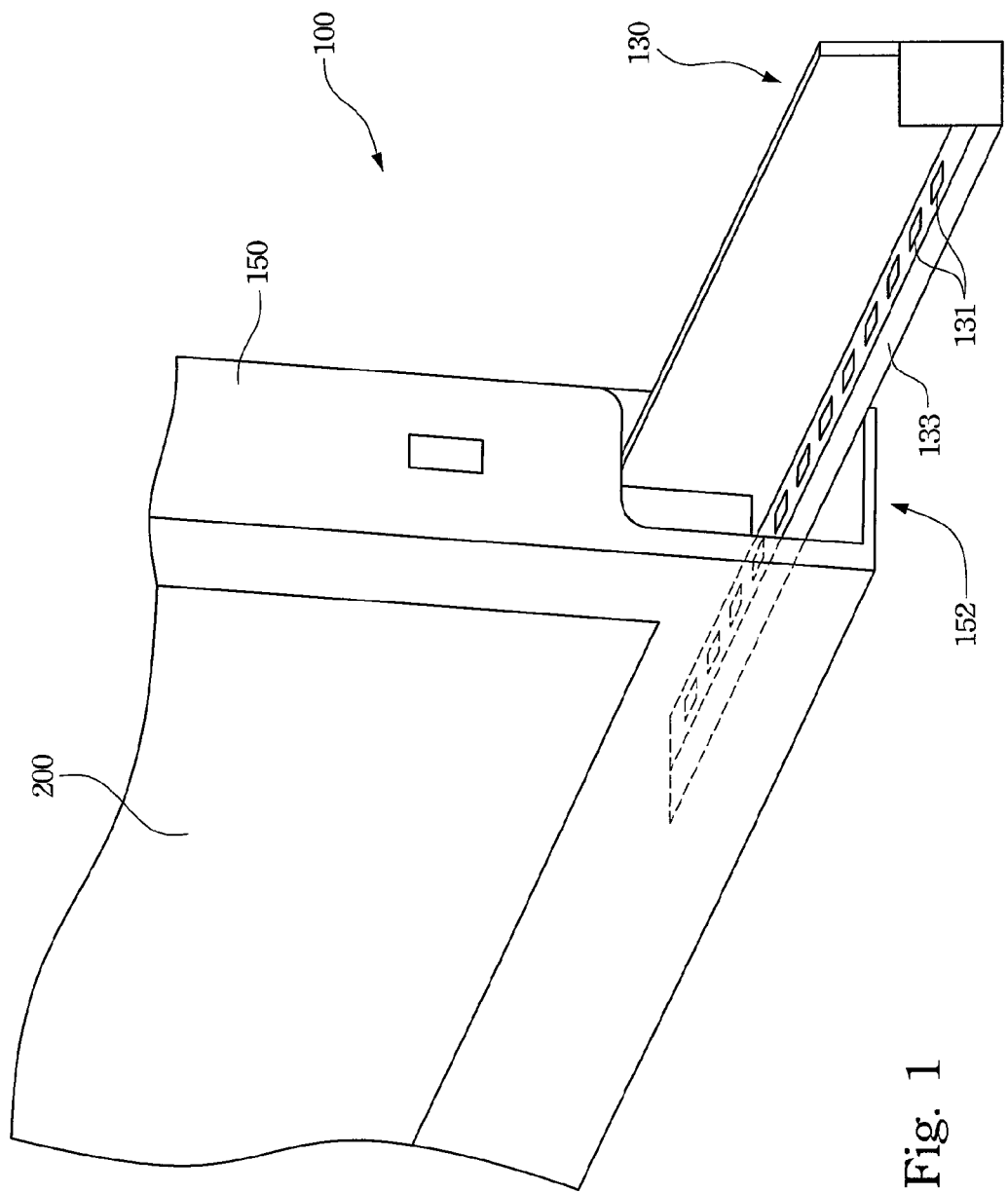
FIG. 1 is a 3-D schematic diagram of a side-entrance lighting structure according to the present invention.

FIG. 1 is a 3-D schematic diagram of a side-entrance lighting structure according to the present invention. A side-entrance lighting structure 100 comprises a substrate structure 130 and a frame 150. The substrate structure 130 comprises a plurality of point light sources 131 disposed on a substrate 133. The frame 150 has an opening 152 located on the bottom corner of the frame 150, wherein the substrate structure 130 is installed into the frame 150 through the opening 152. An optical sheet 200 may be a light guide plate, a reflector, a prism film, a diffuser, or a combination thereof. With the optical sheet 200, a uniform backlight can be made by the side-entrance lighting structure 100.

Figure 2A:
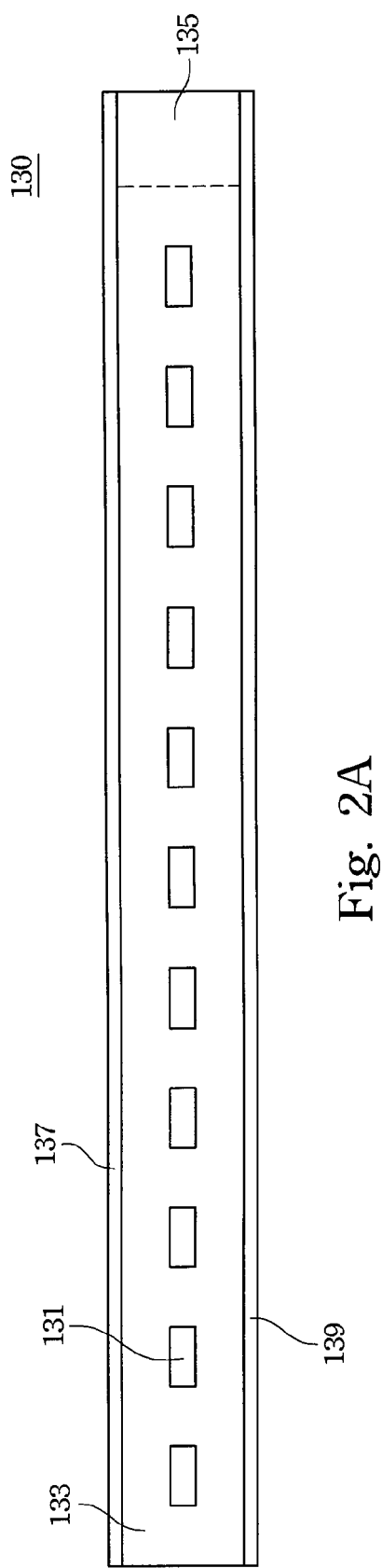
FIG. 2A is a schematic top view of a substrate structure according to the present invention.
Figure 2B:
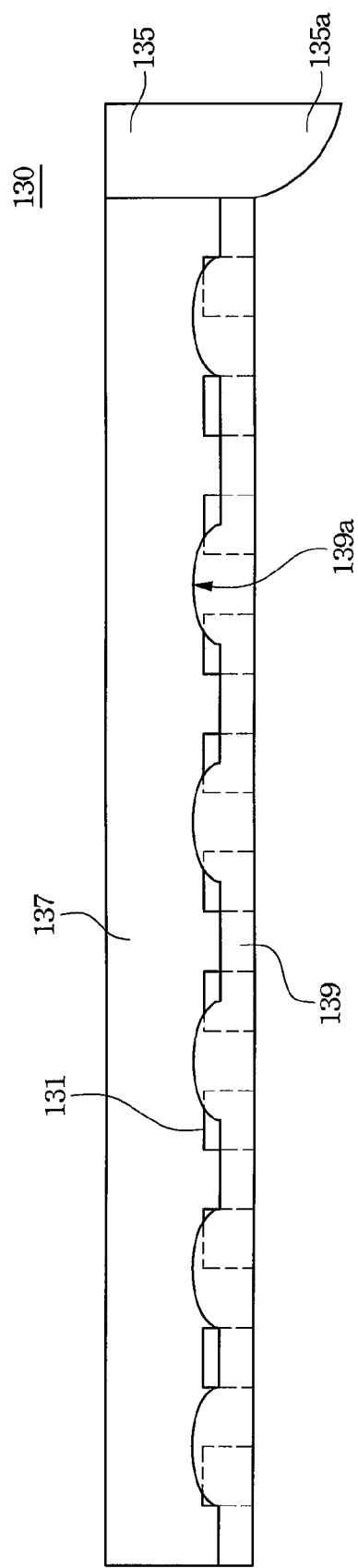
FIG. 2B is a schematic side view of the substrate structure according to the present invention.

FIG. 2A is a schematic top view of a substrate structure according to the present invention, and FIG. 2B is a schematic side view of the substrate structure. The substrate structure 130 comprises the point light sources 131 disposed on the substrate 133. The point light sources 131 may be light emitting diode chips or light emitting diode packages. In one preferable embodiment, intervals between two adjacent point light sources 131 of all the point light sources 131 are the same. However, the invention is not limited to the above description and can be revised based on practical requirements. In one preferable embodiment, a reflector is disposed or a reflective material is coated on the substrate 133.

A first wall 139 is on a long side of the substrate 133 and a second wall 137 is on the other long side of the substrate 133. The first wall 139 is opposite to the second wall 137. The first wall 139 and the second wall 137 are substantially perpendicular to the substrate 133, and both of them have a reflective surface to increase optical efficiency, e.g. being a reflective metal, disposing a reflector, or coating a reflective material. In one preferable embodiment, a reflective surface of the first wall 139 can face a reflective surface of the second wall 137.

The first wall 139 comprises a plurality of convex members 139a. The convex members 139a extend from the first wall 139 along a direction that is substantially perpendicular to the substrate 133. In one preferable embodiment, all apexes of the convex members 139a are farther from the substrate 133 than apexes of the point light sources 131 are. Therefore, the structure of the first wall 139 can prevent abrasion from the contact between the point light sources 131 and the optical sheet 200 when installing the light sources. Either, an apex of at least one convex member 139a is farther from the substrate 133 than apexes of the point light sources 131 are, and at least one convex member 139a may be disposed on the end regions or the middle region of the first wall 139. Moreover, the convex members 139a may be continuously arranged without intervals, continuously arranged with intervals, or a combination thereof. However, the invention is not limited to the above description and can be revised based on practical requirements.

Intervals between any two adjacent convex members 139a of all the convex members 139a may not be the same. In other words, at least one interval between two adjacent convex members 139a is different from other intervals between two adjacent convex members 139a. In one preferable embodiment, intervals between any two adjacent convex members 139a of all the convex members 139a are different from one another. The order of the interval arrangement may be dependent on the dimension (e.g. arranging a large size interval to a small size interval in sequence), at random, or on practical requirements. Besides, the substrate structure 130 may have a brace 135 comprising a brace protrusion 135a on the bottom.

Figure 3A:
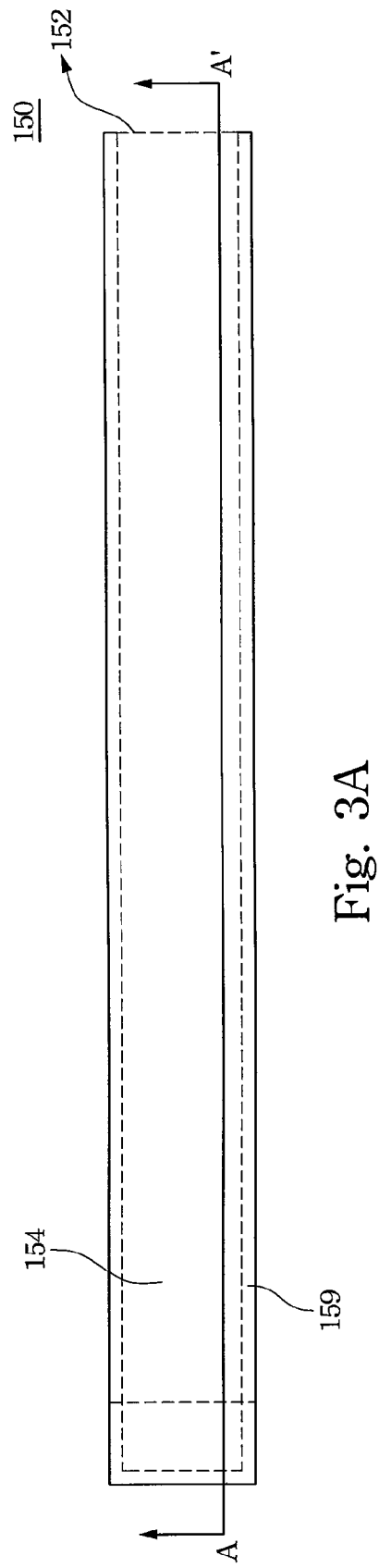
FIG. 3A is a schematic top view of a frame structure according to the present invention.
Figure 3B:
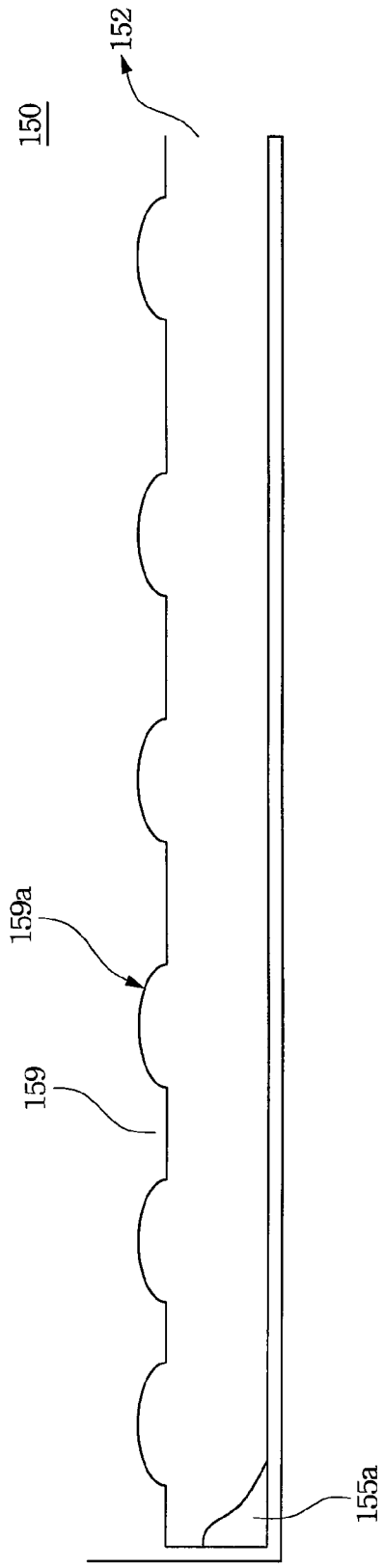
FIG. 3B is a schematic cross-section of the frame structure according to the present invention.

FIG. 3A is a schematic top view of a frame structure according to the present invention, and FIG. 3B is a schematic cross-section of the frame structure taken along line A-A' in FIG. 3A. The frame 150 has a vacancy 154, wherein an opening 152 of the vacancy 154 is located on the bottom corner of the frame 150. The substrate structure 130 is installed into the frame 150 through the opening 152. The frame 150 has a third wall 159 opposite to the first wall 139 of the substrate structure 130 (FIG. 2B). The third wall 159 has a plurality of concave sections 159a. After the substrate structure 130 is installed into the frame 150, each of the concave sections 159a of the third wall 159 complementarily engages a corresponding convex member 139a of the first wall 139. Intervals between two adjacent concave sections 159a of all the concave sections 159a may be not the same. However, the invention is not limited to the above description and can be revised based on practical requirements.

In one preferable embodiment, the borders of the convex members 139a and concave sections 159a are arcs. However, the invention is not limited to the above description and can be revised based on practical requirements to choose different shapes, sizes, or heights, etc. And each of the convex members 139a (or concave sections 159a) may be different. Moreover, to increase optical efficiency, a reflector may be attached or a reflective material may be coated on the internal surface of the third wall 159.

Referring to FIGS. 2B and 3B, the frame 150 may comprise a frame protrusion 155a on the internal bottom section of the frame 150. The height of the brace protrusion 135a and the height of the frame protrusion 155a are the same. Therefore, after the substrate structure 130 is installed into the frame 150, the substrate structure 130 which simultaneously contacts the brace protrusion 135a and the frame protrusion 155a are arisen to the same height to be close to the optical sheet 200.

Referring to FIGS. 1, 2B, and 3B, apexes of the convex members 139a are farther from the substrate 133 than apexes of the point light sources 131 are. The design protects the point light sources 131 when installing the light sources. After the substrate structure 130 is installed into the frame 150, the concave sections 159a complementarily engage the corresponding convex members 139a to shorten the distance between the point light sources 131 and the optical sheet 200. In other words, after the substrate structure 130 is installed into the frame 150, the brace protrusion 135a and frame protrusion 155a will help the substrate structure 130 arisen to a higher altitude to make the convex members 139a just be engaged by the concave sections 159a.

The concave sections 159a (or convex members 139a) may have different intervals between two adjacent concave sections 159a (or convex members 139a) to let the convex members 139a not engaged by the concave sections 159a at the moment the substrate structure 130 enters the frame 150. The convex members 139a are just engaged by the concave sections 159a only after the substrate structure 130 is installed into the frame 150. In other words, after the substrate structure 130 is installed into the frame 150, the convex members 139a could just be engaged by the corresponding concave sections 159a. The concave sections 159a (or convex members 139a) have different intervals between two adjacent concave sections 159a (or convex members 139a). Therefore, when the substrate structure 130 enters into the frame 150, the concave sections 159a (or convex members 139a) can prevent abrasion to the optical sheet 200; when the installation of the substrate structure 130 is finished, the point light sources 131 are close to the optical sheet 200.

FIG. 4A is a schematic cross-section of the convex members of the first wall and the concave sections of the third wall, according to the present invention. FIG. 4B is a schematic cross-section of the engagement of the convex members and concave sections, according to the present invention. At the moment the substrate structure 130 enters the frame 150, the different intervals between two adjacent convex members 139a (or concave sections 159a) make the convex members 139a of the first wall 139 unengaged by the concave sections 159a of the third wall 159. Only after the substrate structure 130 is installed into the frame 150, the convex members 139a are just engaged with the corresponding concave sections 159a. Therefore, the distance between the substrate structure 130 and the optical sheet 200 before the engagement is greater than that after the engagement.

The distance between the substrate structure 130 and the optical sheet 200 before the engagement is greater, which means the distance between the point light sources 131 and the optical sheet 200 is also greater. So, the design can prevent damage to the optical sheet 200 or electrical elements. The distance between the substrate structure 130 and the optical sheet 200 after the engagement is less, which means the point light sources 131 are closer to the optical sheet 200 and the optical efficiency will be increased. In one preferable embodiment, the optical sheet 200 is a light guide plate. The shorter distance between the point light sources 131 and optical sheet 200 is better. However, to consider the unavoidable deviation in processing or mechanism, in one preferable embodiment, the distance between the point light sources 131 and the optical sheet 200 is reserved as 0 to 0.3 mm in advance.

It will be apparent to those skilled in the art that various modifications and variations can be revised to the structure of the present invention without departing from the scope or spirit of the invention. In view of the foregoing, it is intended that the present invention cover modifications and variations of this invention provided they fall within the scope of the following claims and their equivalents.

What is claimed is:

1. A substrate structure, comprising:
   a substrate;
   a plurality of point light sources disposed on the substrate;
   a first wall on a long side of the substrate and substantially perpendicular to the substrate;
   a second wall on the other long side of the substrate and opposite to the first wall, wherein the second wall is substantially perpendicular to the substrate, and the first wall and the second wall have reflective surfaces; and
   a plurality of convex members extending from the first wall along a direction that is substantially perpendicular to the substrate.

2. The substrate structure as claimed in claim 1, wherein apexes of the convex members are farther from the substrate than apexes of the point light sources are.

3. The substrate structure as claimed in claim 1, wherein intervals between any two adjacent convex members of the convex members are different from one another.

4. The substrate structure as claimed in claim 1, wherein the borders of the convex members are arcs.

5. The substrate structure as claimed in claim 1, wherein the point light sources are light emitting diode chips or light emitting diode packages.

6. A side-entrance lighting structure, comprising:
   a substrate structure, comprising:
      a substrate;
      a plurality of point light sources disposed on the substrate;
      a first wall on a long side of the substrate and substantially perpendicular to the substrate;
      a second wall on the other long side of the substrate and opposite to the first wall, wherein the second wall is substantially perpendicular to the substrate, and the first wall and the second wall have reflective surfaces; and
      a plurality of convex members extending from the first wall along a direction that is substantially perpendicular to the substrate; and
   a frame having an opening located on the bottom corner of the frame, wherein the substrate structure is installed into the frame through the opening.

7. The side-entrance lighting structure as claimed in claim 6, wherein apexes of the convex members are farther from the substrate than apexes of the point light sources are.

8. The side-entrance lighting structure as claimed in claim 6, wherein intervals between any two adjacent convex members of the convex members are different from one another.

9. The side-entrance lighting structure as claimed in claim 6, wherein the borders of the convex members are arcs.

10. The side-entrance lighting structure as claimed in claim 6, wherein the point light sources are light emitting diode chips or light emitting diode packages.

11. The side-entrance lighting structure as claimed in claim 6, wherein the substrate structure further comprising:
    a brace disposed at an end of the substrate and having a brace protrusion on the bottom.

12. The side-entrance lighting structure as claimed in claim 11, wherein the frame further comprising:
    a frame protrusion located on an internal side of the frame and opposite to the opening.

13. The side-entrance lighting structure as claimed in claim 12, wherein the height of the brace protrusion and the frame protrusion are the same.

14. The side-entrance lighting structure as claimed in claim 6, wherein the frame further comprising:
    a third wall disposed on the frame and having a plurality of concave sections, wherein intervals between any two adjacent concave sections of the concave sections are different from one another.

15. The side-entrance lighting structure as claimed in claim 6, wherein the frame further comprising:
    a third wall disposed opposite to the first wall, wherein the third wall has a plurality of concave sections complementarily engaging with the corresponding convex members of the first wall.

16. The side-entrance lighting structure as claimed in claim 6, further comprising:
    an optical sheet, wherein the distance between the optical sheet and the point light sources is from 0 mm to about 0.3 mm.

17. The side-entrance lighting structure as claimed in claim 16, wherein the optical sheet is a light guide plate.

18. A substrate structure comprising:
    a substrate;
    a plurality of point light sources disposed on the substrate;
    a first wall on a long side of the substrate and substantially perpendicular to the substrate; and
    a plurality of convex members extending from the first wall along a direction that is substantially perpendicular to the substrate, wherein intervals between any two adjacent convex members of the convex members are different from one another.

19. A side-entrance lighting structure comprising:
    a substrate structure, comprising:
       a substrate;
       a plurality of point light sources disposed on the substrate;
       a first wall on a long side of the substrate and substantially perpendicular to the substrate; and
       a plurality of convex members extending from the first wall along a direction that is substantially perpendicular to the substrate; and
    a frame having an opening located on the bottom corner of the frame, wherein the substrate structure is installed into the frame through the opening, wherein intervals between any two adjacent convex members of the convex members are different from one another.

* * * * *